No. 648,358. Patented Apr. 24, 1900.
M. C. MOORE.
CULTIVATOR.
(Application filed June 26, 1899.)

(No Model.) 2 Sheets—Sheet 1.

WITNESSES,
John Francis
Ellis Bader

Mark C. Moore, INVENTOR,
By Robert S. Carr
Atty.

No. 648,358. Patented Apr. 24, 1900.
M. C. MOORE.
CULTIVATOR.
(Application filed June 26, 1899.)

(No Model.) 2 Sheets—Sheet 2.

WITNESSES.
John Francis
Ellis Bader

Mark C. Moore INVENTOR.
By Robert S. Carr.
Atty.

UNITED STATES PATENT OFFICE.

MARK C. MOORE, OF HAMILTON, OHIO, ASSIGNOR TO THE H. P. DEUSCHER COMPANY, OF SAME PLACE.

CULTIVATOR.

SPECIFICATION forming part of Letters Patent No. 648,358, dated April 24, 1900.

Application filed June 26, 1899. Serial No. 721,937. (No model.)

*To all whom it may concern:*

Be it known that I, MARK C. MOORE, a citizen of the United States, and a resident of Hamilton, Ohio, have invented certain new and useful Improvements in Cultivators, of which the following is a specification.

My invention relates to cultivators; and the objects of my improvement are to pivot the pole to the hounds in such a manner that the wheels may be guided by the lateral movement of the pole, to provide antifriction-rollers to carry the weight of the operator and permit the guiding to be accomplished with greater ease, and to provide means to shift the spindles in front or rear of the frame to compensate for the presence or absence of the weight of the operator and maintain a better balance of the parts on the wheels. These objects are attained in the following-described manner, as illustrated in the accompanying drawings, in which—

Figure 1:
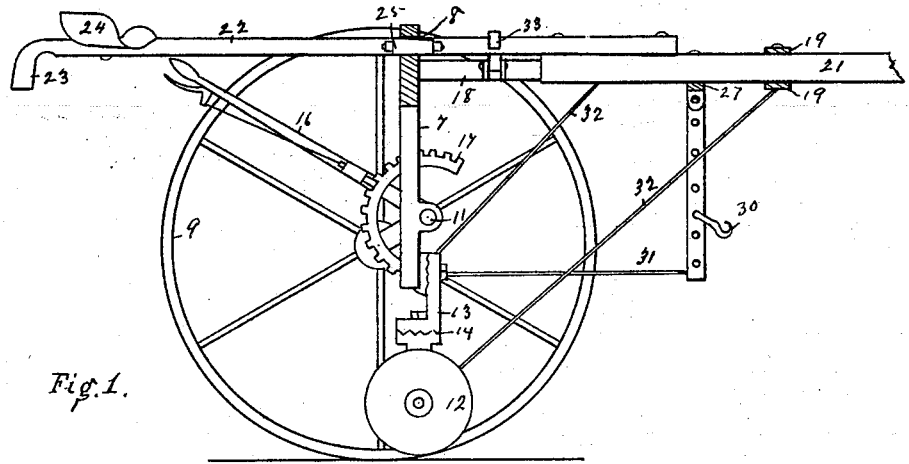
Figure 2:
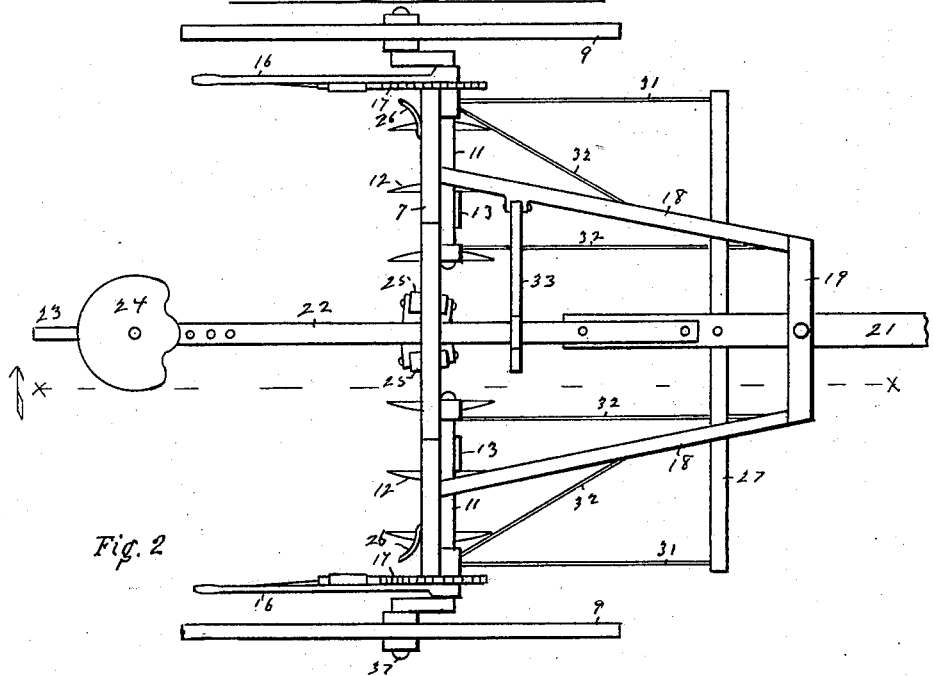
Figure 3:
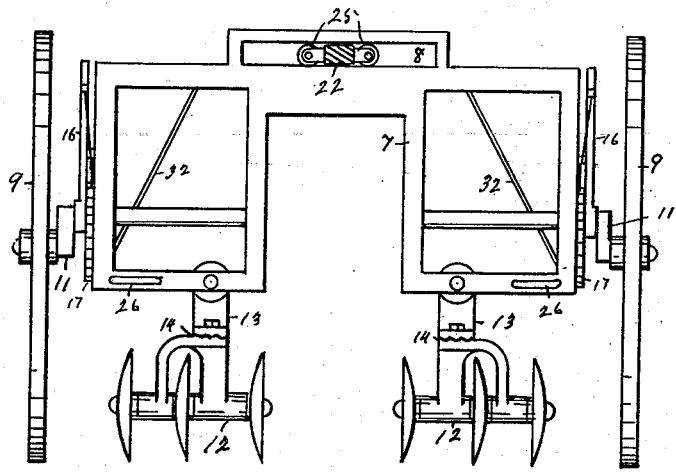
Figure 4:
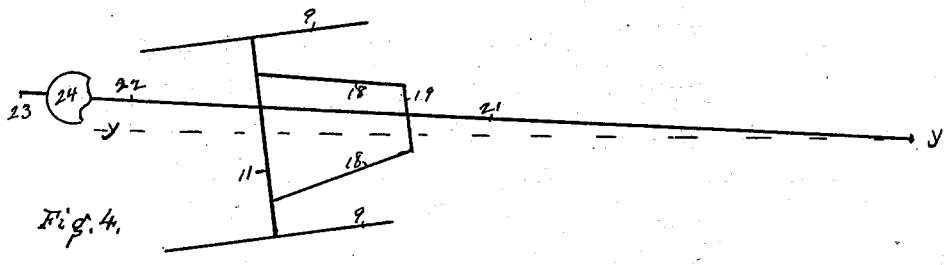
Figure 5:
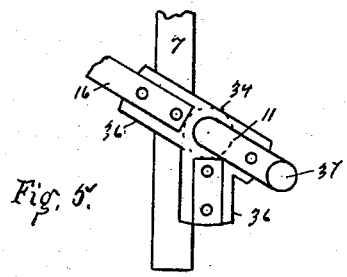

Figure 1 is a longitudinal section on the dotted line $x\,x$ of Fig. 2; Fig. 2, a plan view; Fig. 3, a rear elevation with parts in section; Fig. 4, a diagram showing the lateral movement of the pole in guiding the wheels, and Fig. 5 a detail of construction.

In the drawings, 7 represents the arched frame, formed with transverse slot 8 in its top portion and mounted on wheels 9 by means of crank-shaped axles 11, that are journaled in the frame. Gangs of concave disks 12 are adjustably attached to the respective sides of the lower portion of the frame by means of shanks 13. Said shanks are formed with serrated joints 14, which permit the gangs to be adjusted in different horizontal angles, and are connected to the frame with similar joints, that permit them to be adjusted in different vertical angles. Hand-levers 16, secured to the axles and provided with detent-catches to engage racks 17, attached to the ends of the frame, control the turning of the axles to vertically adjust the frame and gangs thereon in relation to the wheels.

Hounds 18 project forwardly from the top of the frame and are connected together in front by metal straps 19, that form a slot between them for the passage therethrough of pole 21. Said pole is pivotally secured to and between the straps and is provided with a handle or rear extension 22, that is extended through slot 8 in the top of the frame and terminates in a downward curve or handhold 23. Seat 24 is adjustably secured on the handle, and antifriction-rollers 25 are journaled on the sides of the handle and travel within slot 8 to provide an easy lateral movement of the pole under the weight of the operator in the seat. Stirrups 26 for the operator's feet are secured to the lower portion of the ends of the frame. Equalizer 27 is pivoted to the pole near the front end of the hounds and drop-hitches depend from the ends thereof. Said hitches are each formed with a series of holes for the vertical adjustment therein of the singletree-hooks 30. Stay-rods 31 connect the lower ends of the hitches with the frame, and brace-rods 32 extend from the frame and the gangs to the hounds to secure rigidity of the various parts when under strain. Latch 33 is hinged to one of the hounds and detachably engages with the handle to lock the pole in a position perpendicular to the frame when desired.

Collar 34 (shown in Fig. 5) is formed with wings 36 at an angle to each other and to the crank portion of the axle 11. The hand-lever may be attached to either of the wings, as it is desired to throw the weight of the frame in front or in rear of the wheel-spindles 37, it being preferable to maintain a more perfect balance that the frame be carried in front of the spindles, as shown in Fig. 1, when the operator rides in the seat and behind them when he walks.

In operation the operator is mounted in the seat with his feet on the stirrups and with the latch removed from the handle. By the exertion of one foot he can move the seat and handle, together with the hounds, to one side, which changes the direction of the wheels to an angle with the tongue, as shown in Fig. 4. By the exertion of the other foot the wheels may be correspondingly changed to the other side of the tongue or pole. The same movements can be effected by means of the handhold in the rear of the seat when the operator is walking.

The resistance to the movement of the handle or pole in the slot in the frame due to the weight of the operator in the seat is overcome by the tapering antifriction-rollers that travel in the slot. The guiding movements are thus made so easy that they may be effected with the feet, while the hands are free to control the team and adjust the frame with the hand-levers.

Having fully described my improvement, what I claim as my invention, and desire to secure by Letters Patent of the United States, is—

1. The combination with a frame mounted on ground-wheels and containing a slot and hounds projecting forwardly therefrom of a pole pivotally secured between the front end of the hounds and extending rearwardly through the slot and movable laterally therein of antifriction-rollers arranged to carry the pole in the slot and a latch adapted to lock the pole in a position perpendicular to the frame.

2. The combination with a frame mounted on wheels and containing a slot, hounds projecting forwardly from the frame and a pole pivotally secured to the front of the hounds and extending through the slot of a seat mounted on the rear portion of the pole beyond the slot and antifriction-rollers journaled on the pole and arranged to carry it laterally in the slot.

MARK C. MOORE.

Witnesses:
R. S. CARR,
DAVID PIERCE.